US011972680B2

(12) United States Patent
Marshall et al.

(10) Patent No.: US 11,972,680 B2
(45) Date of Patent: Apr. 30, 2024

(54) BASE FOR TABLE TOP SANITIZER DISPENSING BOTTLES AND DISPENSER BOTTLES

(71) Applicant: GOJO Industries, Inc., Akron, OH (US)

(72) Inventors: Aaron D. Marshall, Silver Lake, OH (US); Mark T. Smith, Canton, OH (US); Paul J. Brown, Independence, OH (US); Aaron R. Reynolds, North Canton, OH (US); Joseph S. Kanfer, Richfield, OH (US); Shelby Jay Buell, Medina, OH (US); Eugene W. Ray, Akron, OH (US)

(73) Assignee: GOJO Industries, Inc., Akron, OH (US)

( * ) Notice: Subject to any disclaimer, the term of this patent is extended or adjusted under 35 U.S.C. 154(b) by 31 days.

(21) Appl. No.: 17/344,452

(22) Filed: Jun. 10, 2021

(65) Prior Publication Data

US 2021/0390836 A1 Dec. 16, 2021

Related U.S. Application Data

(60) Provisional application No. 63/038,359, filed on Jun. 12, 2020.

(51) Int. Cl.
*G08B 7/06* (2006.01)
*A47K 5/12* (2006.01)
*G08B 5/36* (2006.01)

(52) U.S. Cl.
CPC .................. *G08B 7/06* (2013.01); *A47K 5/12* (2013.01); *G08B 5/36* (2013.01); *A47K 2005/1218* (2013.01)

(58) Field of Classification Search
CPC ... G08B 7/06; G08B 5/36; A47K 5/12; A47K 2005/1218
(Continued)

(56) References Cited

U.S. PATENT DOCUMENTS

D103,562 S 3/1937 Cook
D103,600 S 3/1937 Shields
(Continued)

FOREIGN PATENT DOCUMENTS

CN 305668621 S 3/2020

OTHER PUBLICATIONS

Mahin Naserpour, Plano-concave microlenses with epsilon-near-zero surface-relief coating for efficient shaping of nonparaxial optical beams, Jan. 2017 (Year: 2017).*

*Primary Examiner* — Zhen Y Wu
(74) *Attorney, Agent, or Firm* — Calfee, Halter & Griswold LLP

(57) ABSTRACT

Table top sanitizer dispenser bottle bases are disclosed herein. An exemplary table top sanitizer dispenser bottle base includes a movable upper housing, the upper moveable housing has a floor with an aperture located therein and a peripheral wall. The top sanitizer dispenser bottle includes a lower stationary housing. The upper movable housing is connected to the lower stationary housing and is configured to move linearly upward and downward with respect to lower stationary. One or more biasing members bias the upper movable housing upward. A switch is included and the upper movable housing has an engagement member or surface for actuating the switch upon downward movement of the upper movable housing. At least one of a visual indicator and an audible indicator are also included. Control
(Continued)

circuitry is provided for activating the one or more of a visual indicator and audible indicator when the engagement member actuates the switch.

18 Claims, 8 Drawing Sheets

(58) Field of Classification Search
USPC .......................................................... 340/500
See application file for complete search history.

(56) References Cited

U.S. PATENT DOCUMENTS

| | | | | |
|---|---|---|---|---|
| D232,564 | S | 8/1974 | Kissin | |
| 3,878,962 | A * | 4/1975 | Holbrook .............. | A61M 1/782 604/320 |
| 3,948,404 | A * | 4/1976 | Collins .................. | B65D 25/24 220/605 |
| 4,082,200 | A * | 4/1978 | Guest ................... | B65D 23/001 D9/500 |
| 4,846,429 | A | 7/1989 | Scheurer et al. | |
| 5,087,005 | A | 2/1992 | Holoff et al. | |
| D331,538 | S | 12/1992 | Fabre | |
| 5,180,132 | A | 1/1993 | Pearson et al. | |
| 5,205,423 | A * | 4/1993 | Ota ...................... | B65D 23/001 220/630 |
| D340,761 | S | 10/1993 | Long | |
| D345,067 | S | 3/1994 | Shafer | |
| 5,516,581 | A * | 5/1996 | Kreckel ..................... | C09J 7/24 428/354 |
| D425,833 | S | 5/2000 | Robinson | |
| D449,137 | S | 10/2001 | Newman | |
| 6,386,494 | B1 | 5/2002 | Huang | |
| D460,691 | S | 7/2002 | Morris et al. | |
| 6,422,402 | B1 | 7/2002 | Hollinger | |
| 6,596,374 | B1 | 7/2003 | Adjeleian | |
| D519,375 | S | 4/2006 | Brooks | |
| 7,124,987 | B2 | 10/2006 | Zschiedrich | |
| D539,145 | S * | 3/2007 | Carlson .......................... | D9/456 |
| D543,109 | S | 5/2007 | Carlson et al. | |
| 7,264,197 | B2 | 9/2007 | Yu | |
| 7,315,245 | B2 * | 1/2008 | Lynn .................. | G09B 19/0076 340/573.1 |
| 7,338,020 | B2 | 3/2008 | Magid | |
| 7,607,622 | B2 | 10/2009 | Carnevali | |
| 7,708,245 | B2 | 5/2010 | Woo | |
| 7,782,214 | B1 * | 8/2010 | Lynn .................... | A47K 5/1217 340/572.1 |
| 7,850,133 | B2 | 12/2010 | Carnevali | |
| 7,861,647 | B2 | 1/2011 | So et al. | |
| 7,975,971 | B2 | 7/2011 | Carnevali | |
| 8,028,850 | B2 * | 10/2011 | Zimmerman ...... | A47G 19/2261 248/346.11 |
| 8,033,517 | B2 | 10/2011 | Wilcoxon | |
| D653,088 | S | 1/2012 | Hansen et al. | |
| D663,206 | S | 7/2012 | Nelson et al. | |
| 8,235,336 | B2 | 8/2012 | Lin et al. | |
| 8,240,508 | B2 | 8/2012 | Wegelin et al. | |
| 8,302,920 | B2 | 11/2012 | Tsai | |
| 8,348,101 | B2 | 1/2013 | Ciavarella et al. | |
| 8,505,861 | B2 | 8/2013 | Carnevali | |
| 8,757,418 | B2 | 6/2014 | Zimmerman et al. | |
| 8,757,426 | B1 | 6/2014 | Serrano | |
| 8,757,572 | B1 | 6/2014 | Starr et al. | |
| D804,307 | S | 12/2017 | Matthews et al. | |
| 9,943,196 | B2 | 4/2018 | Mak et al. | |
| 10,149,575 | B2 * | 12/2018 | Tojek ...................... | B05B 15/62 |
| 10,653,277 | B2 | 5/2020 | Harris et al. | |
| D914,998 | S | 3/2021 | Fan | |
| D948,745 | S | 4/2022 | Gross et al. | |
| 2004/0116035 | A1 * | 6/2004 | Fitchmun ................. | A47K 5/12 446/15 |
| 2005/0205605 | A1 * | 9/2005 | Clapper ................... | A47K 5/12 222/113 |
| 2007/0206372 | A1 * | 9/2007 | Casillas ................. | B65D 23/00 362/101 |
| 2008/0000927 | A1 * | 1/2008 | Butler ................. | B05B 11/0005 222/113 |
| 2010/0012617 | A1 * | 1/2010 | Ulibarri ............... | B65D 1/0276 215/371 |
| 2011/0180564 | A1 * | 7/2011 | Jones ....................... | A47K 5/12 222/113 |
| 2013/0020351 | A1 * | 1/2013 | Pelfrey ................ | A47K 5/1214 222/23 |
| 2013/0334248 | A1 * | 12/2013 | Iseri ..................... | G08B 21/245 222/207 |
| 2016/0144551 | A1 * | 5/2016 | Siegl ....................... | B29C 49/48 264/529 |
| 2018/0155113 | A1 * | 6/2018 | Wolak .................... | B65D 83/38 |
| 2018/0263432 | A1 * | 9/2018 | Yang .................... | A47K 5/1217 |
| 2019/0298114 | A1 * | 10/2019 | Melgoza ................... | B05B 7/26 |
| 2020/0158328 | A1 * | 5/2020 | Mattice .................. | B65D 23/00 |

* cited by examiner

BASE FOR TABLE TOP SANITIZER DISPENSING BOTTLES AND DISPENSER BOTTLES

RELATED APPLICATIONS

The application claims priority to, and the benefits of, U.S. Provisional Patent Application Ser. No. 63/038,359, tiled BASE FOR TABLE TOP SANITIZER DISPENSING BOTTLES which was filed on Jun. 12, 2020, and which is incorporated herein by reference in its entirety.

TECHNICAL FIELD

The present invention generally relates to bases for table top sanitizer dispenser bottles. More particularly, the present invention relates to home bases for sanitizer table top sanitizer dispenser bottles that provide feedback.

BACKGROUND OF THE INVENTION

Hand sanitizer is often sold in bottles that are placed on tables, counters, desks and the like. Many of the bottles of hand sanitizer include a nozzle. To obtain a dose of hand sanitizer, the nozzle is pushed downward and a dose of hand sanitizer is dispensed into a user's hand. Companies, agencies, hospitals and the like, attempt to strategically place the table top sanitizer dispenser bottles in strategic locations to attempt to keep people safe and provide ease of access at locations where complying with set hand hygiene protocols is recommended. People, however, often pick up table top dispensers and move them to different locations. In addition, during periods of high cold and flu seasons, and in particular times of global pandemics, such as, the Covid-19 pandemic that is currently occurring, hand sanitizer is hard to come by and people often walk-off with the table top sanitizer dispenser bottles for their personal use. Accordingly, there is a need for device that provides a fixed base for table top sanitizer dispensing bottles. In addition, there is a need for a fixed base that provides feedback to one or more users.

SUMMARY

Exemplary embodiments of table top sanitizer dispenser bottle bases are disclosed herein. An exemplary table top sanitizer dispenser bottle base includes a movable upper housing, the upper moveable housing has a floor and a peripheral wall. An aperture is located in the floor. The top sanitizer dispenser bottle includes a lower stationary housing. The upper movable housing is connected to the lower stationary housing and is configured to move linearly upward and downward with respect to lower stationary. One or more biasing members bias the upper movable housing upward. A switch is included and the upper movable housing has an engagement member or surface for actuating the switch upon downward movement of the upper movable housing. At least one of a visual indicator and an audible indicator are also included. Control circuitry is provided for activating the one or more of a visual indicator and audible indicator when the engagement member actuates the switch.

Another exemplary table top sanitizer dispenser bottle base includes a movable upper housing. The upper moveable housing has a receptacle formed at least in part by a peripheral wall and a floor. A light and a lower stationary housing are included. The upper movable housing is connected to the lower stationary housing and is configured so that at least a portion of the upper movable housing moves downward when downward pressure is applied the a bottle inserted into the receptacle. One or more biasing members configured to bias at least a portion of the upper movable housing upward. A switch and control circuitry are also provided. The switch is engageable by at least a portion of the upper housing and the control circuitry activates the light when the switch is actuated.

An exemplary table top sanitizer dispenser bottle and base includes a movable upper housing. The housing has a receptacle formed at least in part by a peripheral wall and a floor. A table top sanitizer dispenser bottle is received within the receptacle. A light, a switch and one or more biasing members to bias the housing in an upward direction are also provided. Downward pressure applied to the table tope sanitizer dispenser bottle causes downward movement of the housing and downward movement of the housing actuates the switch which causes the light to be illuminated.

An exemplary soap or sanitizer dispenser includes a container, a pump, a nozzle, and a light refraction area located on the container. One or more lenses are located in the light refraction area. The one or more lenses are configured to be located proximate a light source when the soap or sanitizer dispenser is located in a table top dispenser bottle base.

An exemplary methodology of manufacturing a soap or sanitizer dispenser canister include providing a blow mold, providing a pre-stretch rod, providing a tip on the pre-stretch rod that has a shape configured to form the top half of a lens for a light refraction area, providing a push up tool having a first surface and a second surface, wherein the second surface has a shape configured to form the bottom half of a lens for the light refraction area. The lens is one of a converging lens and a diverging lens. The methodology further includes providing a preform, utilizing the pre-stretch rod and the push up tool to form a lens in the light refraction area of the preform and injecting air into the preform to expand the preform to fill the blow mold to form a container having a lens formed in the light refraction area.

BRIEF DESCRIPTION OF THE DRAWINGS

These and other features and advantages of the present invention will become better understood with regard to the following description, and accompanying drawings where.

DETAILED DESCRIPTION

Figure 1:
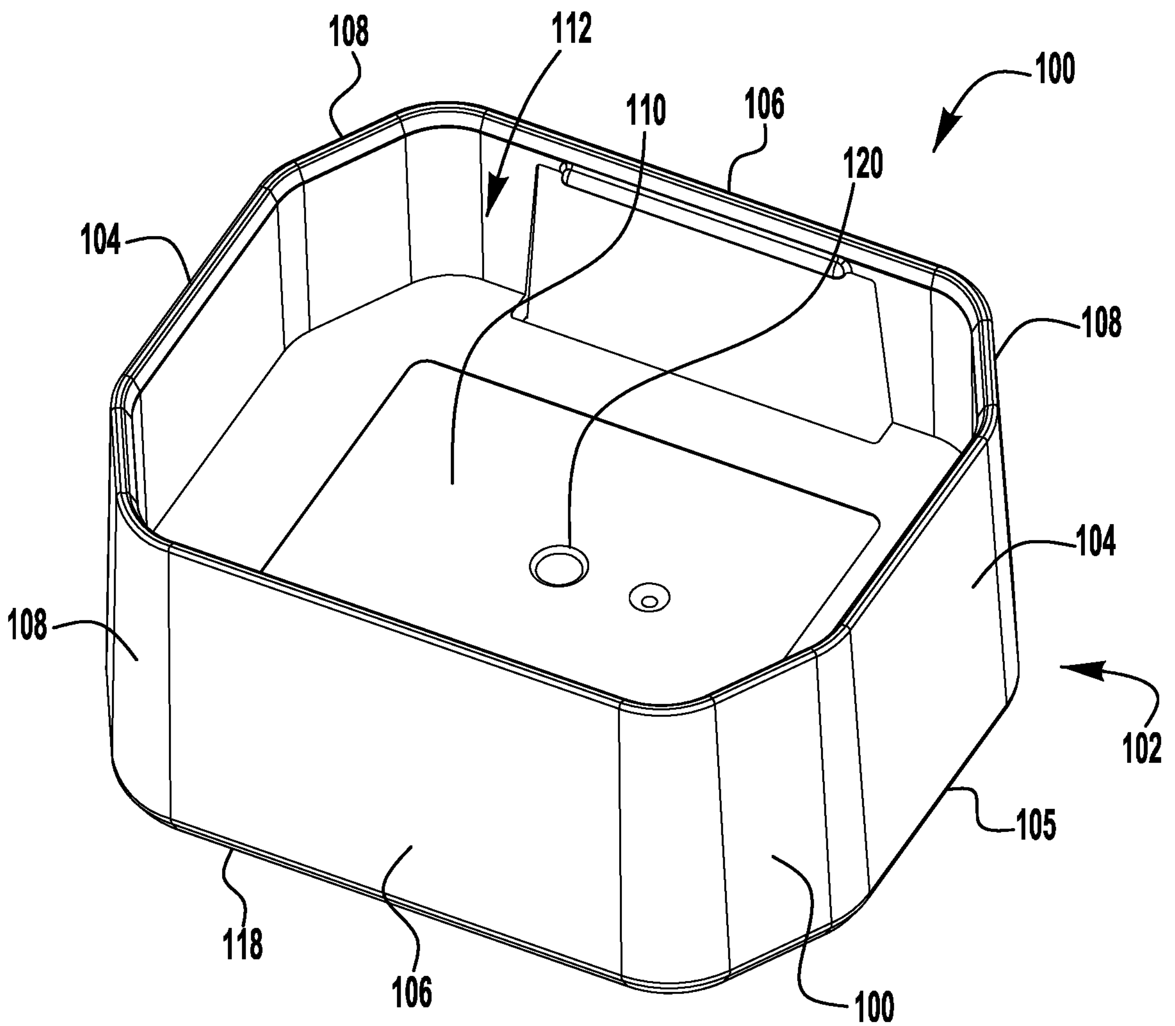
FIG. 1 is a prospective view of an exemplary semi-permanent base for a table top sanitizer dispensing bottle.
Figure 2:
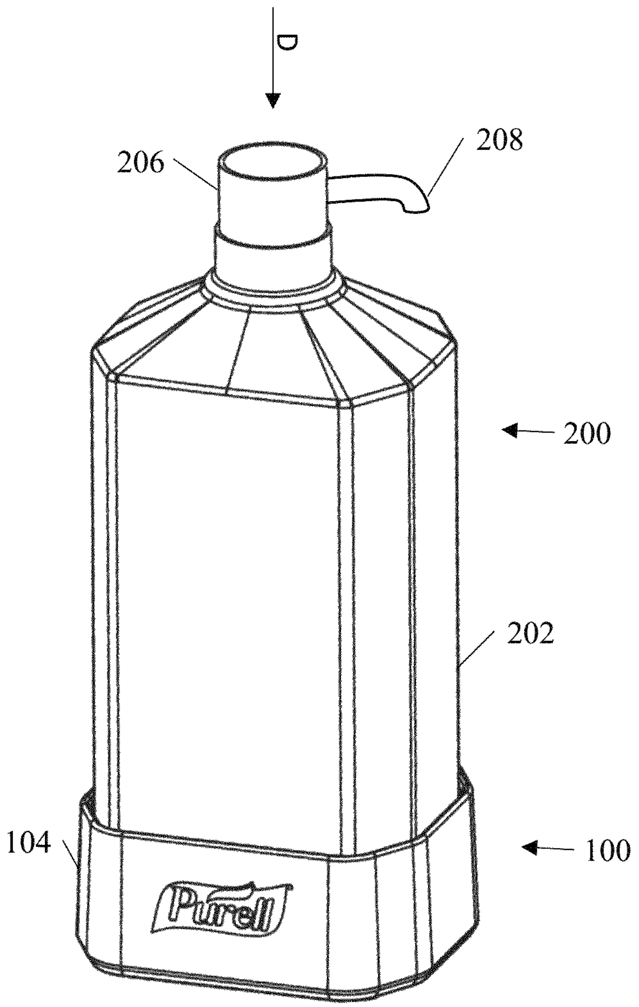
FIG. 2 is a prospective view of an exemplary semi-permanent base with a table top sanitizer dispensing bottle inserted therein.

Exemplary embodiments of semi-permanent bases for table top sanitizer dispensing bottles are disclosed herein. FIG. 1 illustrates an exemplary semi-permanent base 100 for a table top sanitizer dispensing bottle 200 (FIG. 2). The semi-permanent base 100 remains secured to a surface under normal usage, but can be removed for cleaning. The semi-permanent base 100 provides a "home" location for the table top sanitizer dispensing bottle 200. It gives business, agencies, hospitals, and the like the ability to put table top sanitizer dispensing bottles 200 in locations that are best suited to achieve the desired hand-hygiene. This semi-permeant base 100 lets the end user know that the table top sanitizer dispensing bottle 200 is supposed to be in this location and will encourage users to use the hand sanitizer. In addition, the table top sanitizer dispenser semi-permanent base 100 aids in the prevention of theft of table top dispensing bottles, because it is obvious that the empty semi-permanent base 100 is missing its dispensing bottle.

The exemplary semi-permanent base 100 has a perimeter wall 102. In this exemplary embodiment, perimeter wall 102 has two side walls 104 and a front and back wall 106 and front and back walls 106 are joined to the side walls 104 by angled, or chamfered walls 108. In this exemplary embodiment, the perimeter wall 102 is configured to match the shape of the table top sanitizer dispensing bottle 200. Perimeter wall 102 may be configured in other shapes, such as, for example, square, rectangular, circular, ovular. Preferably, perimeter wall 102 has the shape of the table top sanitizer dispenser bottle that it is designed to hold.

Semi-permanent base 100 includes a floor 110. In this exemplary embodiment, perimeter wall 102 and floor 110 form a receptacle 112 for receiving the table top sanitizer dispenser bottle 200.

In this exemplary embodiment, semi-permanent base 100 has a bottom 118. In this exemplary and preferred embodiment, to make the base a semi-permanent base, a releasable tape (not show) is adhered to the bottom 118. The releasable tape allows a user to releasable secure the base to a surface (not shown). In some embodiments, the bottom 118 may be removed from the semi-permanent base 100 and connected to the surface (not shown) using other fastening means, such as, for example, screws. In some embodiments, a permanent adhesive may be applied to bottom 118 to permanently affix semi-permanent base 100 to the surface.

In this exemplary embodiment, floor 110 includes an aperture 120 therethrough. On or more aperture 120 allows light projected from within semi-permanent base 100 to travel out of semi-permanent base 100. In some exemplary embodiments, a transparent, or translucent material (not shown) is placed on the floor 110 and covers aperture 120 to prevent liquid, dust, or other materials from passing through the aperture 120 into the interior of semi-permanent base 100. The transparent or translucent material (not shown), may be referred to herein as a shield, a dust shield, a liquid tight shield, or the like.

In some embodiments, two or more apertures (not shown) may be located in the base. In some embodiments, one or more light pipes (not shown) may be used to direct light from within the base to one or more apertures in the semi-permanent base 100. The one or more apertures may be in the floor 110 or in the side wall 104. In addition, the one or more apertures may be located on the interior of the sidewall or the floor and configured to illuminate the container, and/or the liquid in the container of the table tope dispenser bottle. In some embodiments, one or more apertures are on the exterior of the side wall 104 and project light outward. In some embodiments, light from inside of the base is projected out from the lower edge 105 of the wall 104 near the bottom 118. The light may project out of one or more cut-outs (not shown) in the lower edge 105, and/or the light may project out from under the lower edge of 105.

In some embodiments, a lens (not shown) may be placed in or over the one or more apertures 120. The lenses may have converging properties, diverging properties and or diffusing properties. These properties are discussed below with respect to the container, and may be utilized in the base. Exemplary converging lenses include, for example, convex lenses, biconvex lenses, plano-convex lenses and positive meniscus lenses and the like. Exemplary diverging lenses include concave lenses, biconcave lenses, plano-concave lenses, negative meniscus lenses, and the like. Diffusers may include for example, rippled surface diffusers, ridged surface diffusers, bumped surface diffusers, dimpled surface diffusers, patterned surface diffusers and the like.

In some embodiments, a locking mechanism (not shown) is included within the receptacle 112 to catch, grip or otherwise retain the bottom of the table top sanitizer dispenser bottle 200. In some embodiments, a release mechanism (not shown) is included to release the locking mechanism (not shown) to facilitate removal of the table top sanitizer dispenser bottle 200. In some embodiments, the release mechanism (not shown), requires a "key" (not shown) to trigger the release mechanism (not shown). In some embodiments, the locking mechanism (not shown) applies a squeezing pressure on the bottle 200 to retain the bottle 200 in place. In some embodiments, the container of the table top sanitizer dispenser bottle 200 includes one or more annular projections (not shown), annular recesses (not shown), one or more projecting members (not shown), and/or one or more recesses (not shown) that are engaged by the locking mechanism (not shown) for aid in retaining the table top sanitizer dispenser bottle 200 in the base 100.

In some embodiments, table top sanitizer dispenser bottle 200 fits loosely in semi-permanent base 100. In some embodiments, the perimeter wall 120 is configured to apply a friction fit to the table top sanitizer dispenser bottle 200 to securely hold the table top sanitizer dispenser bottle 200 in place. In some embodiments, a gripper material (not shown), such as, for example, rubber or silicon, is placed along the interior of perimeter wall 104, or one or more portions thereof, to grip the table top sanitizer dispenser bottle 200 when the table top sanitizer dispenser bottle 200 is placed in the semi-permanent base 100.

FIG. 2 is a prospective view of a table top sanitizer dispenser bottle 200 inserted into semi-permanent base 100. Top sanitizer dispenser bottle 200 has a container 202 for holding sanitizer, a pump 206 secured to the dispenser and an outlet nozzle 208. A user pushes down in direction D on the pump 206 to cause sanitizer to be dispensed out of nozzle 208. When the user pushes down in direction D, a portion of that downward force is directed into the semi-permanent base 100. In some embodiments, when the downward force is applied to semi-permanent base 100, a switch (not shown) is activated. Activating the switch causes a light source, such as, for example, a light emitting diode ("LED"), inside the semi-permanent base 100 to turn on. The light emitted from the light source travels through aperture 120 in the base and lights up the sanitizer in container 202. In some embodiments, the light source stays energized for a preselected period of time, such as, for example, 5 seconds, and then turns off.

In some embodiments, the light source lights up periodically without a user pressing down on the table top sanitizer dispenser bottle 200 to remind persons in the vicinity that they may need to sanitize their hands.

In some embodiments, the light source lights up upon removal of the table top sanitizer dispenser bottle 200 from the semi-permanent base 100. The illumination of the light source may be deter persons from taking the table top sanitizing dispenser bottle 200 from its intended position as the illuminated base would immediately signal to others that the table top sanitizing dispenser bottle 200 has been taken. In some embodiments, in the event that the table top sanitizing dispenser bottle 200 is empty, the illuminated light source may prompt the individual tasked with replacing the table top sanitizing dispenser bottle 200, to replace the table top sanitizing dispenser bottle 200.

In some embodiments, base 100 includes counter circuitry. The counter may decrement or increment a counter each time the switch is activated. When a preselected number of activations of the switch have occurred, the light source may flash continuously, or periodically, to alert the maintenance staff that the table top sanitizing dispenser bottle 200 needs to be replaced. Once the table top sanitizing dispenser bottle 200 is replaced, the counter may be reset. The counter may be reset manually, or reset automatically when the sanitizing dispenser bottle 200 is removed from base 100.

In some embodiments, the light source is a single color light source, such as, for example, a blue LED. In some embodiments, a user may select the color of light that is emitted from a plurality of colors, such as, for example, a yellow LED, a blue LED, and a red LED. In some embodiments, two or more light sources may be illuminated at one time. In some embodiments, illuminating multiple light sources at the same time, allows for additional colors to be emitted, such as, for example, illuminating a blue LED and a yellow LED may emit a green light. In some embodiments, different color lights are emitted at different apertures allowing multiple colors of light to illuminate the sanitizer. In addition, in some embodiments, the multiple colors of light intersect part way up the container, thus creating an additional color part way up the container 202.

In some embodiments, pushing down on the pump 206 in direction D, causes the base to emit an audible signal to indicate that the table top sanitizer dispenser bottle 200 has dispensed a dose of fluid. In some embodiments, the audible signal is a chime, or a ding. In some embodiments, the audible signal is a song or jingle. In some embodiments, the audible signal is emitted for a selected period of time. In some embodiments, the preselected period of time is the amount of time that a user should rub the sanitizer into their hands.

Figure 3:
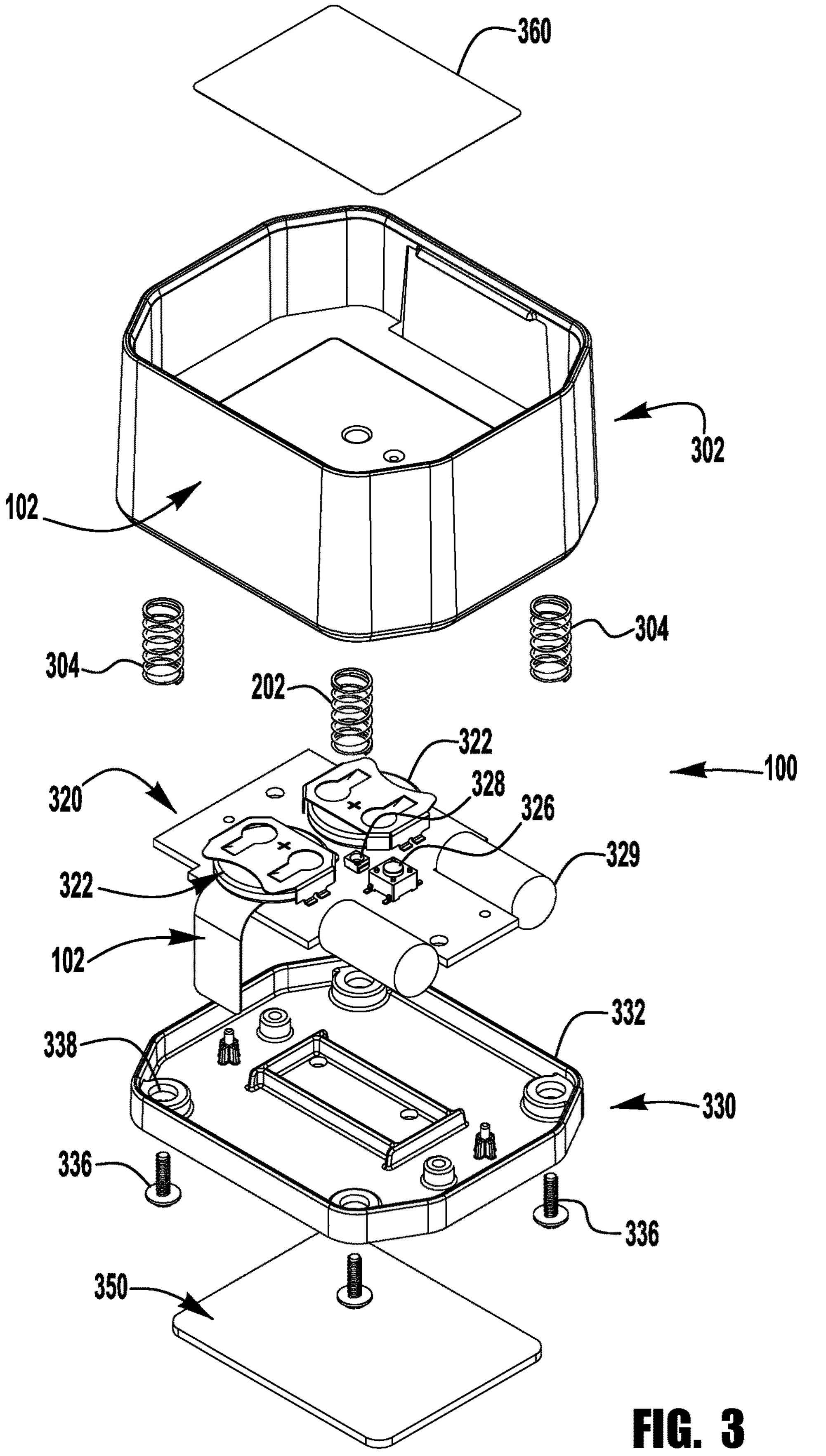
FIG. 3 is an exploded view of an exemplary semi-permanent base.

FIG. 3 is an exploded view of the exemplary semi-permanent base 100. In this exemplary embodiment, semi-permanent base 100 includes an upper movable housing 302 and a lower stationary housing 330. Upper movable housing 302 is secured to lower stationary housing 330 by one or more screws 336. The one or more screws 336 pass through apertures 338 in the base plate 332 of lower stationary housing 330 and connect to one or more connection points (not shown) in upper movable housing 302. The screws 336 and connection points are configured to allow for the movable upper housing to move up and down in a lateral motion with respect to lower stationary housing 330. Upper movable housing 302 is biased upward by one or more biasing members 304, such as, for example, one or more springs.

The one or more biasing members 304 are selected to have a biasing strength that is greater than the biasing strength to support the weight of the upper moveable housing member 302 and a full table top sanitizer dispenser bottle 200. The biasing strength is also preferably less than the biasing strength required to support the weight of the upper moveable housing member 302, an empty table top sanitizer dispenser bottle and the force required to compress the pump of the table top sanitizer dispensing bottle. Accordingly, the biasing members 304 are of sufficient strength to prevent unintentional movement of the upper movable housing 302 and to allow movement of the upper movable housing member 302 when a user presses on the pump 206 of the table top sanitizer dispenser bottle 200.

Secured to lower stationary housing 330 is a circuit board 320. Circuit board 320 includes the necessary circuitry to perform the operations described herein. The electronic components described herein may be in circuit communication with one or more other electronic components. "Circuit communication" as used herein indicates a communicative relationship between devices. Direct electrical, electromagnetic and optical connections and indirect electrical, electromagnetic and optical connections are examples of circuit communication. Two devices are in circuit communication if a signal from one is received by the other, regardless of whether the signal is modified by some other device. For example, two devices separated by one or more of the following—amplifiers, filters, transformers, optoisolators, digital or analog buffers, analog integrators, other electronic circuitry, fiber optic transceivers or satellites—are in circuit communication if a signal from one is communicated to the other, even though the signal is modified by the intermediate device(s). As another example, an electromagnetic sensor is in circuit communication with a signal if it receives electromagnetic radiation from the signal. As a final example, two devices not directly connected to each other, but both capable of interfacing with a third device, such as, for example, a CPU, are in circuit communication.

Also, as used herein, voltages and values representing digitized voltages are considered to be equivalent for the purposes of this application, and thus the term "voltage" as used herein refers to either a signal, or a value in a processor representing a signal, or a value in a processor determined from a value representing a signal.

"Signal", as used herein includes, but is not limited to one or more electrical signals, analog or digital signals, one or more computer instructions, a bit or bit stream, or the like.

"Logic," synonymous with "circuit" as used herein includes, but is not limited to hardware, firmware, software and/or combinations of each to perform a function(s) or an action(s). For example, based on a desired application or needs, logic may include a software controlled microprocessor or microcontroller, discrete logic, such as an application specific integrated circuit (ASIC) or other programmed logic device. Logic may also be fully embodied as software. The circuits identified and described herein may have many different configurations to perform the desired functions.

Circuit board 320 includes a switch 326, one or more light sources 328, such as, for example one or more light emitting diodes ("LED"s) and one or more energy sources 322, such as, for example, one or more coin cell batteries. In addition, circuit board 320 includes one or more optional capacitors 329. The capacitors 329 are in circuit communication with the one or more batteries 322 and circuit board 320 includes capacitor charge circuitry (not shown) for charging the one or more capacitors 329. Switch 326 is in circuit communication with the one or more light sources 328, the one or more capacitors 329 and/or one or more batteries 322. In this exemplary embodiment, switch 326 is an "off-delay" switch. Accordingly, when switch 326 is actuated (by being pushed downward in this exemplary embodiment) the switch remains on for a period of time, such as, for example, 5 seconds, and then turns off. When switch 326 is activated, light source 328 is illuminated for the selected period of time and then turns off. Upper moveable housing 302 has a switch engagement area (not shown) that engages switch 326 and when upper movable housing 302 moves downward, the switch 302 is activated. In some embodiments, switch 326 is a normally open switch 326 that is biased upward and when it is moved downward, the normally open switch 326 closes momentarily to trigger a timing circuit or relay to illuminate the light source 328, which remains on for the period of time set by the timing circuit.

As discussed above, a speaker (not shown) or other audible generator (not shown) may be used in addition to, or in leu of the light source. In some embodiments, the audible generator or speaker may play a jingle or a song when a user obtains a dose of sanitizer. In some embodiments, the audible generator or speaker may be set to periodically chime or otherwise provide an indication to people in close proximity that they may need to sanitizer their hands. In some embodiments, a periodic or other indication may be used to alert visually impaired users that there is a table top sanitizer dispenser bottle 200 in the near proximity.

In some embodiments, an additional bottle is inserted switch (not shown) is included. The bottle is inserted switch may be located in the receptacle 112 and may be used to detect if a bottle is inserted into the semi-permanent base 100. If a table top sanitizer dispenser bottle 200 is inserted in the base, the bottle inserted switch may be closed. If the table top sanitizer dispenser bottle 200 is removed from the semi-permanent base 100, the light source 328 may illuminate to alert people in the surrounding area that someone has taken the table top sanitizer dispenser bottle 200 out of the semi-permanent base 100. In some embodiments, the light source 328 pulses on and off to conserve battery life. Once a table top sanitizer dispenser bottle 200 is reinserted into the semi-permanent base, the light source turns off. If a counter is being used to determine when the bottle is empty, the bottle is inserted switch may be used to reset the counter.

In some embodiments, circuit board 320 includes a processor (not shown) on the back side of the circuit board. The processor may be any type of processor, such as, for example, a microprocessor or microcontroller, discrete logic, such as an application specific integrated circuit (ASIC), other programmed logic device or the like. The processor is in circuit communication with memory (not shown). The memory may be any type of memory, such as, for example, Random Access Memory (RAM); Read Only Memory (ROM); programmable read-only memory (PROM), electrically programmable read-only memory (EPROM), electrically erasable programmable read-only memory (EEPROM), flash, ROM, or the like, or combinations of different types of memory. In some embodiments, the memory is separate from the processor, and in some embodiments, the memory resides on or within processor. The processor may be in circuit communication with switch 326, light source 328, capacitors 329 and/or batteries 322, and any other intermediary circuitry that is required to perform the functions described herein, and the processor controls the on/off time of the light source 328, audible source or the like.

The processor may allow for a sequenced programming of the light source, such as, for example, flashing of the light source, intermittent turning on and off the light source without being triggered by a user dispensing a dose of sanitizer. A processor may be used to control an audible generator as well. In addition, the processor may include logic for counting the dispensing of doses of fluid and providing an indication that the table top sanitizer dispenser 200 should be replaced.

In this exemplary embodiment, a battery tape tab 102 is included. The battery tap tab 102 prevents operation of the circuit board 320 to prevent draining the battery. The battery tape tab 102 is pulled out of the device prior to installing the device to place the one or more energy sources 322 in circuit communication with the other components.

In this exemplary embodiment, a transparent covering 360 is placed in the receptacle 112 and sealed to the base 110. The transparent covering 360 may protect aperture 120 and the light source and circuitry below it and may also facilitate cleaning as it may be removed and replaced.

In addition, in this exemplary embodiment, base 100 includes releasable tape 350, such as, for example, a double sided heavy duty traceless removable washable nano gel grip tape. In this exemplary embodiment, the releasable tape 350 may be used to adhere the semi-permanent base 100 in a desired location. The semi-permanent base 100 may be pulled up and removed from that location to clean under and/or around the semi-permanent base 100. After removing the semi-permanent base 100, a user may wash and dry the removable tape 350 and re-adhere the semi-permanent base 100 to the surface.

Figure 4:
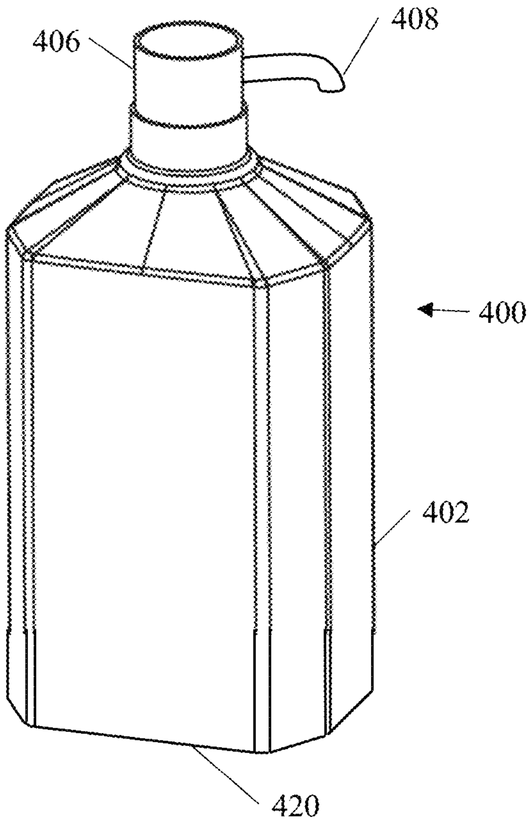
FIG. 4 is an exemplary dispenser having a light refraction area having light diffusing or focusing properties.
Figure 5:
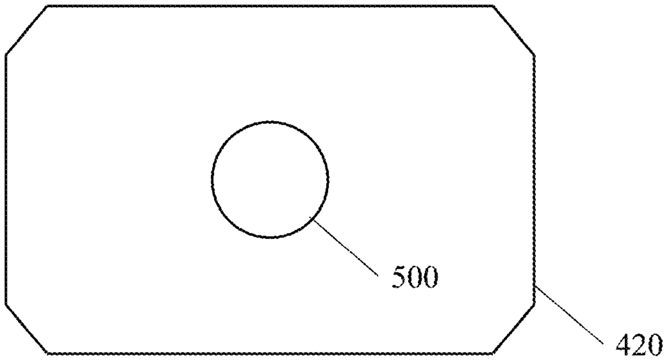
FIG. 5 is a bottom view of an exemplary dispenser having a light refraction area having light diffusing or light focusing properties.

FIG. 4 is an exemplary dispenser 400 having a light refraction area having light diffusing or focusing properties. Dispenser 400 includes container 402 for holding sanitizer or soap. In this exemplary embodiment, dispenser 400 includes a manual pump 406 and a dispensing spout 408. The novel and inventive concepts are described in detail below with respect to table top sanitizer dispensing bottles, however, the inventive concepts may be used in touch-free and manual wall dispensers, and refill units for such dispensers. Exemplary touch-free wall dispensers are shown and disclosed in U.S. Pat. No. 8,240,508 titled Low cost radio frequency identification (RFID) dispensing systems, U.S. Pat. No. 8,348,101 titled Locking Dispenser, U.S. Pat. No. 10,149,575 titled Slide Open Refillable Dispenser, U.S. Pat. No. 9,9431,196 titled Sequentially Activated Multi-Diaphragm Foam Pumps, Refill Units And Dispenser Systems, U.S. Pat. No. 10,6532,277 titled Manual Dispensers Requiring Lower Force To Operate, each of which is incorporated herein by reference in its entirety. Container 402 includes a bottom 420. In this exemplary embodiment, container bottom 420 has a light refraction area 500 (FIG. 5) that has light diffusing or light focusing properties.

In this exemplary embodiment, light refraction area 500 may include one or more lenses, one or more textured surfaces with differing light refraction properties or the like. Light refraction area may focus the light, or may diffuse the light. In this exemplary embodiment, light refraction area 500 has a circular shape and is configured to be located above the aperture in the base that the light shines through. Light refraction area 500 may have any shape such as, for example, rectangular, triangular or the like.

Figure 6A:
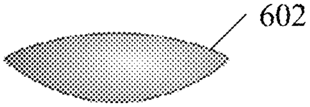
FIGS. 6A-6D are cross-sectional views of lenses for exemplary light refraction areas that have light converging focal properties.
Figure 6B:
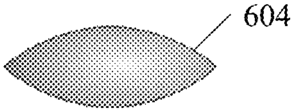
Figure 6C:
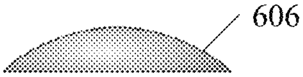
Figure 6D:
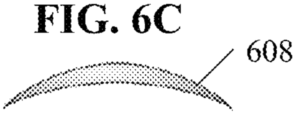

FIGS. 6A-6D are cross-sectional views of lenses for use in exemplary light refraction areas that have light converging focal properties. FIG. 6A is a cross-sectional view of a convex lens that may be used in the exemplary light refraction areas. FIG. 6B is a cross-sectional view of a biconvex lens that may be used in the exemplary light refraction areas. FIG. 6C is a cross-sectional view of a plano-convex lens that may be used in the exemplary light refraction areas, and FIG. 6D is a cross-sectional view of a positive meniscus lens that may be used in the exemplary light refraction areas.

Figure 7A:
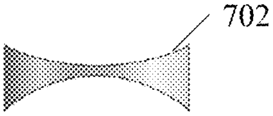
FIG. 7A-7D are cross-sectional views of lenses for exemplary light refraction areas that have light diverging focal properties.
Figure 7B:
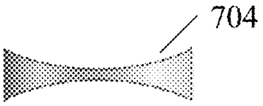
Figure 7C:
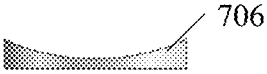
Figure 7D:
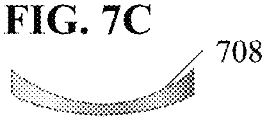

FIG. 7A-7D are cross-sectional views of lenses for use in exemplary light refraction areas that have light converging focal properties. FIG. 7A is a cross-sectional view of a concave lens that may be used in the exemplary light refraction areas. FIG. 7B is a cross-sectional view of a biconcave lens that may be used in the exemplary light refraction areas. FIG. 7C is a cross-sectional view of a plano-concave lens that may be used in the exemplary light refraction areas, and FIG. 7D is a cross-sectional view of a negative meniscus lens that may be used in the exemplary light refraction areas.

Figure 8A:
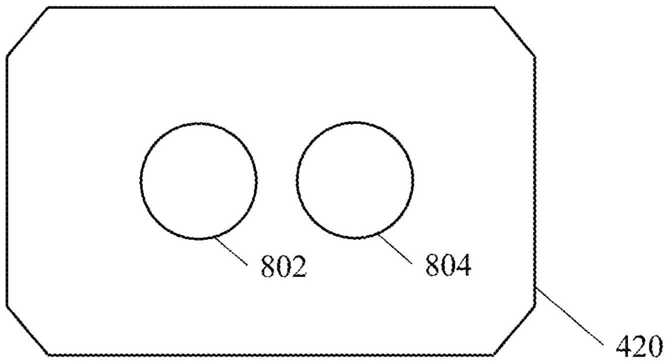
FIGS. 8A-8C are bottom views exemplary dispensing containers having one or more light refraction areas having light diffusing or light focusing properties.

FIG. 8A is another exemplary embodiment of a bottom 420 having a plurality of light refraction areas 802, 802. While two light refraction areas are identified, there may be more than two light refraction areas. In some embodiments, one or more light refraction areas are substantially identical. In some embodiments, one or more light refraction areas are different. In some embodiments, a first portion of the light refraction area has a first type of refraction and a second portion has a second type of refraction. For example, a center area may have diverging refractory focus and a concentric area around the center area may have a converging refractory focus.

Preferably, each of the one or more light refraction areas has a light source associated therewith. In some embodiments, one or more LEDs are associated with each light refraction area. In some embodiments, one or more light pipes direct light to the one or more light refraction areas.

Figure 8B:
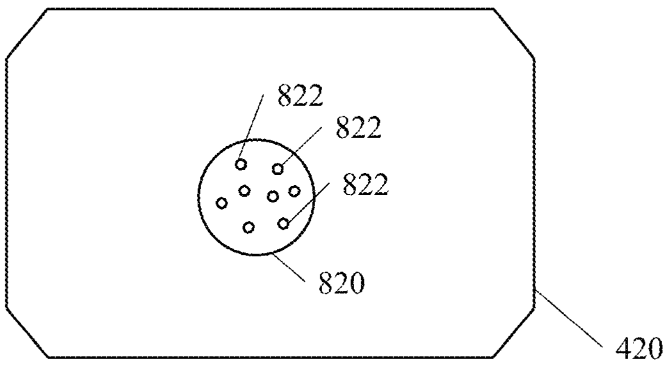

FIG. 8B illustrates bottom 420 having a light refraction area 820. Light refraction area 820 includes a plurality of dimples 822 which refract light. In some embodiments, the dimples protrude towards the interior of the container 402 and in some embodiments, the dimples protrude away from the interior of the container 402.

Figure 8C:
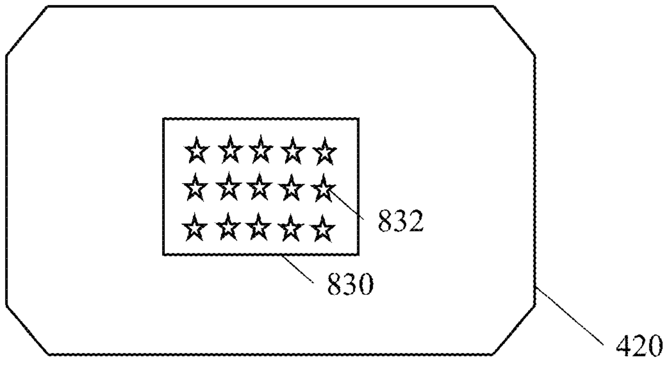

FIG. 8C illustrates bottom 420 having a light refraction area 830. Light refraction area 830 is rectangular and incudes a plurality of shapes 832 that have different refractory properties then the rest of light refraction area 830.

In some embodiment, the lens or light refraction area is formed in the bottle or container. In some embodiments, the lens or light refraction area is affixed to, or adhered to, the bottle or container.

Figure 9:
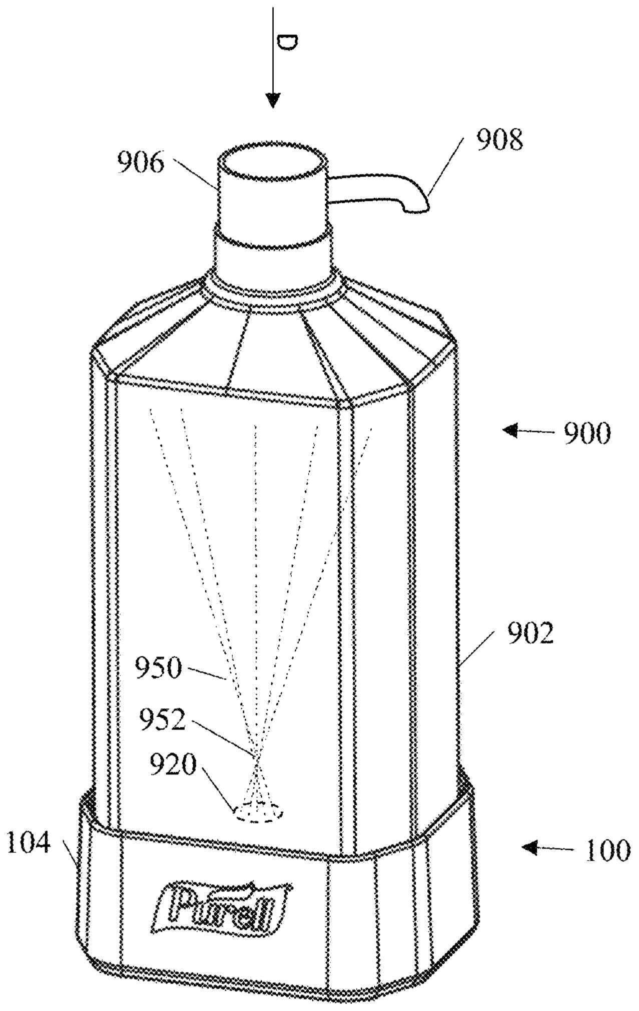
FIG. 9 is a prospective view of an exemplary semi-permanent base with a table top sanitizer dispensing bottle inserted therein having a light refraction area of light diffusing or light focusing properties.

FIG. 9 is a prospective view of an exemplary semi-permanent base 100 with a table top sanitizer dispensing bottle 900. Table top sanitizer dispensing bottle 900 includes a pump 906, and outlet 908 and a container 902. Container 902 includes a light refraction area 920. In this exemplary embodiment, light refraction area 920 is a converging lens that focusses light beams 950 to a point 952. The location of point 952 will be determined by the refractory properties of the refraction area 920.

The embodiments disclosed herein show and describe the one or more refraction areas in the bottom of the container. The one or more refraction areas may be located in one or more sides and/or in the top of the container. The one or more refraction areas will be located by one or more light sources. If the container is to be used in a wall mounted dispenser, for example, the one or more refraction areas may be located along the back of the container and may be illuminated by one or more lights located behind the container.

Figure 10:
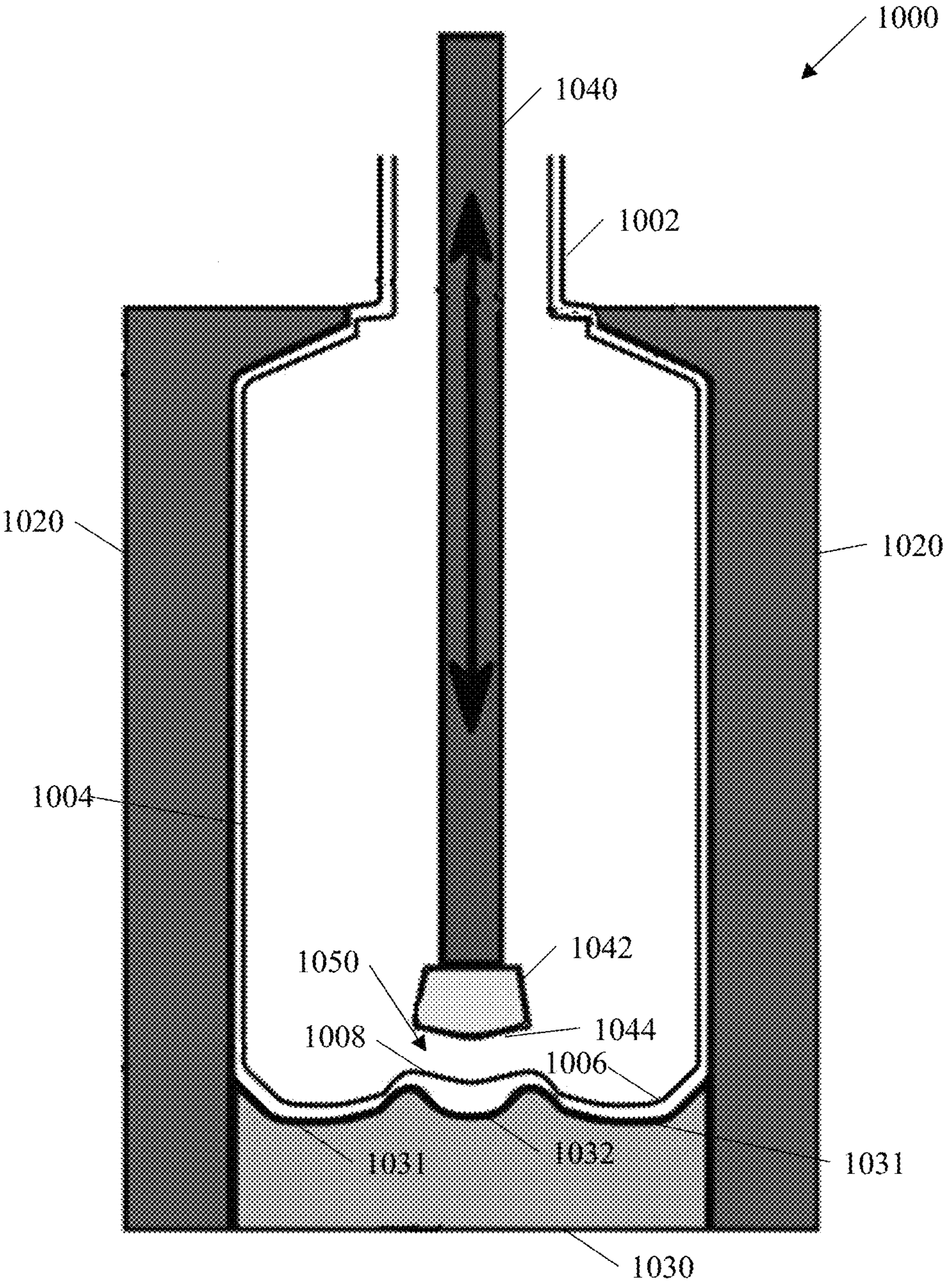
FIG. 10 is an exemplary embodiment of a manufacturing process for forming a dispensing container having one or more light refraction areas of light diffusing or light focusing properties.

FIG. 10 is an exemplary embodiment of a manufacturing process 1000 for forming a dispensing container having one or more light refraction areas of light diffusing or light focusing properties. The exemplary embodiment of a manufacturing process 1000 is for blow molding of a container. In the exemplary manufacturing process, blow mold(s) 1020, a pre-stretch tool 1040 and a push up tool 1030 are utilized. In this exemplary embodiment, pre-stretch tool includes a stretch rod tip 1042. Stretch rod tip 1042 has a lower surface 1044. The shape of lower surface 1044 is selected based on the type of refraction desired in the light refraction area. In this exemplary embodiment, lower surface 1044 is configured to form a concave upper surface in the light refraction area 1050. Push up tool includes a first area 1031 and a second area 1032 located in the middle. Area 1032 is shaped or selected based on the type of refraction desired in the light refraction area 1050. During the blow molding process, the lower surface 1044 of tip 1042 pushes down on section 1008 of the pre-form. Compression between lower surface 1044 of tip 1042 and area 1032 on push up tool 1030 forms the light refraction area on the container. Lower surface 1044 and area 1032 may be configured to form reflective facets, texture, and/or lens geometry in a container that manipulates a light source from a dispenser or base.

In some embodiments, the material used in the blow molding manufacturing process comprises PET.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention, in its broader aspects, is not limited to the specific details, the representative apparatus and illustrative examples shown and described. Accordingly, departures may be made from such details without departing from the spirit or scope of the applicant's general inventive concept.

We claim:

1. A table top sanitizer dispenser bottle base comprising:
a movable upper housing;
the upper moveable housing having
 a floor; and
 a peripheral wall;
 wherein the peripheral wall extends upward above a top surface of the floor;
an aperture located in the floor;
a lower stationary housing;
the upper movable housing connected to the lower stationary housing and configured to move linearly upward and downward with respect to lower stationary housing;
one or more biasing members configured to bias the upper movable housing upward;
a visual indicator;
the visual indicator located below the aperture located in the floor;
a switch;
the upper movable housing having an engagement member for actuating the switch upon downward movement of the upper movable housing; and
control circuitry for activating the visual indicator when the engagement member actuates the switch.

2. The table top sanitizer dispenser bottle base of claim 1 wherein the visual indicator is a light.

3. The table top sanitizer dispenser bottle base of claim 2 wherein the light remains on for a period of less than about 5 minutes.

4. The table top sanitizer dispenser bottle base of claim 1 wherein the peripheral wall comprises a front wall joined to a first side wall by a chamfered wall, the first side wall is joined to a back wall by a chamfered wall, the back wall is joined to a second side wall by a chambered wall and the second side wall is joined to the front wall by a chamfered wall.

5. The table top sanitizer dispenser bottle base of claim 1 wherein the peripheral wall has a shape that is configured to match a shape of a table top sanitizer dispenser bottle that is configured to be placed in the dispenser bottle base.

6. The table top sanitizer dispenser bottle base of claim 1 further comprising one or more table top sanitizer dispenser bottle retaining members.

7. The table top sanitizer dispenser bottle base of claim 1 further comprising one or more capacitors in circuit communication with the switch for providing power to the one or more of a visual indicator and an audible indicator.

8. The table top sanitizer dispenser bottle base of claim 1 further comprising releasable and reusable tape located on a bottom of the lower stationary housing.

9. The table top sanitizer dispenser bottle base of claim 1 further comprising a light diffraction member located proximate the aperture.

10. A table top sanitizer dispenser bottle and base comprising:

a movable upper housing;

the moveable upper housing having a receptacle formed at least in part by a peripheral wall; and a floor;

an aperture located in the floor;

wherein the peripheral wall extends above a top surface of the floor;

a table top sanitizer dispenser bottle received within the receptacle;

a light;

the light located below the aperture;

a switch;

one or more biasing members to bias the housing in an upward direction;

wherein downward pressure applied to the table top sanitizer dispenser bottle causes downward movement of the housing; and wherein the downward movement of the housing actuates the switch and causes the light to be illuminated.

11. The table top sanitizer dispenser bottle and base of claim 10 wherein the light is a blue light emitting diode.

12. The table top sanitizer dispenser bottle and base of claim 10 wherein the light remains on for a period of less than about 5 minutes.

13. The table top sanitizer dispenser bottle and base of claim 10 wherein the control circuitry activates an audible signal in addition to the light.

14. The table top sanitizer dispenser bottle and base of claim 10 wherein the peripheral wall comprises a front wall joined to a first side wall by a chamfered wall, the first side wall is joined to a back wall by a chamfered wall, the back wall is joined to a second side wall by a chambered wall and the second side wall is joined to the front wall by a chamfered wall.

15. The table top sanitizer dispenser bottle and base of claim 10 further comprising one or more table top sanitizer dispenser bottle retaining members.

16. A soap or sanitizer dispenser comprising:

a container;

a pump;

a nozzle; and a light refraction area located on the container;

one or more lenses located in the light refraction area;

wherein the one or more lenses have one or more focal points;

wherein the one or more focal points are located within an interior of the container;

wherein the one or more lenses are configured to be located proximate a light source when the soap or sanitizer dispenser is located in a table top dispenser bottle base.

17. The soap or sanitizer dispenser of claim 16 wherein the light refraction area is located on a bottom of the container.

18. The soap or sanitizer dispenser of claim 16 wherein a portion of the one or more lenses are concave.

* * * * *